United States Patent

[11] 3,565,445

[72] Inventor August Hodges
 New Rochelle, N.Y.
[21] Appl. No. 780,701
[22] Filed Dec. 3, 1968
[45] Patented Feb. 23, 1971
[73] Assignee Polyflon Corporation
 New Rochelle, N.Y.

[54] SEAL ARRANGEMENTS
 8 Claims, 4 Drawing Figs.
[52] U.S. Cl. ..................................... 277/47,
 277/9, 277/184, 277/187
[51] Int. Cl. .......................................F16k 41/00,
 F16j 15/00
[50] Field of Search........................................... 277/184,
 187, 182, 183, 153, 47, 152, 35, 9

[56] References Cited
 UNITED STATES PATENTS
 2,049,366 7/1936 Gardner...................... 277/47
 2,542,141 2/1951 Horton........................ 277/153
 3,276,783 10/1966 McKinven, Jr. ............. 277/183
 FOREIGN PATENTS
 953,305 3/1964 Great Britain................ 277/184

Primary Examiner—Samuel G. Rothberg
Attorney—Ward, McElhannon, Brooks and Fitzpatrick ABSTRACT: Fluid seals for rotating, vibrating or reciprocating shafts and made of a washer shaped sealing element of polytetrafluoroethylene and a washer-shaped gasket of an elastomeric material squeezed together by a metal plate casing.

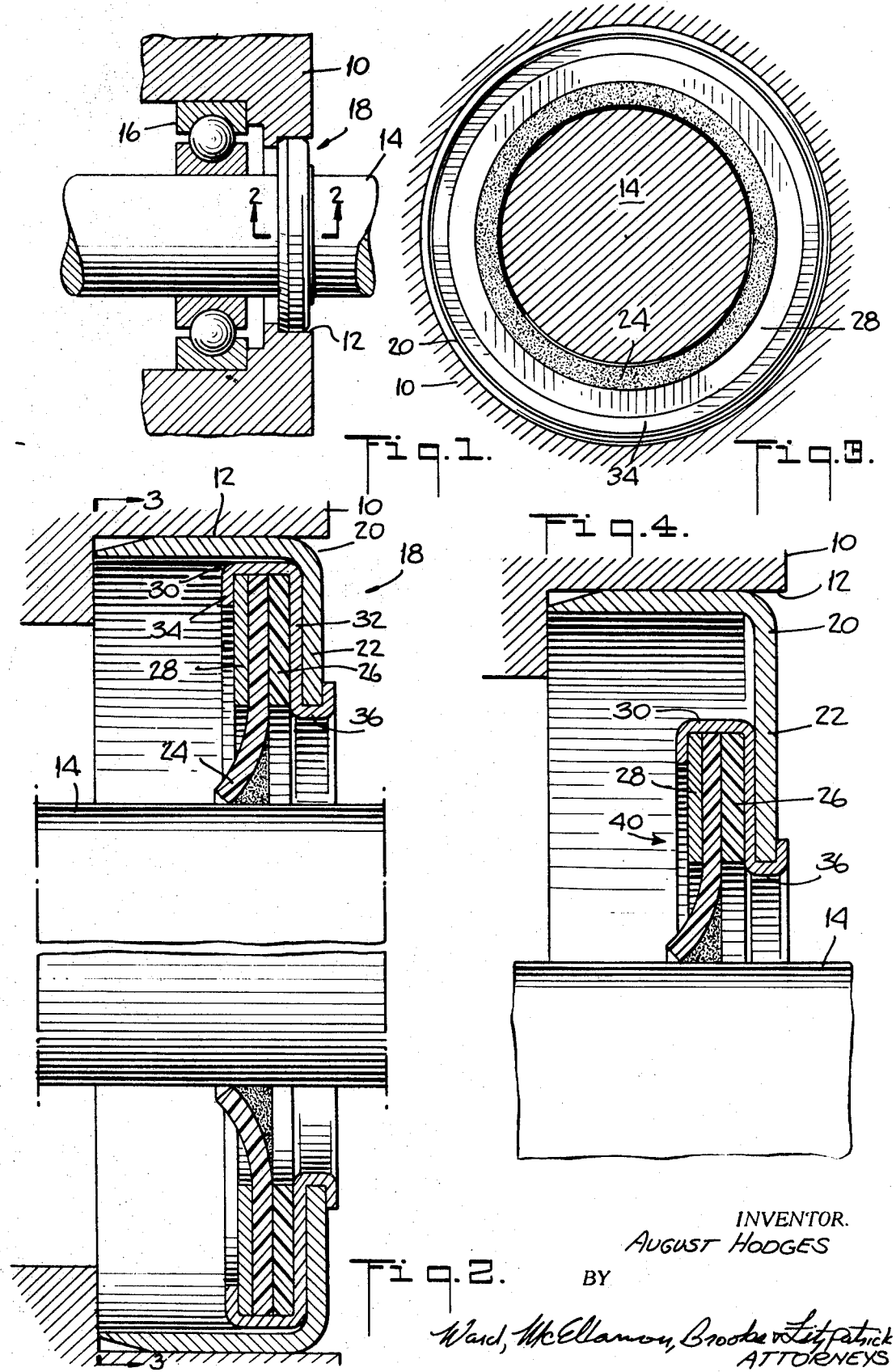

SEAL ARRANGEMENTS

This invention relates to fluid seals and more particularly it concerns novel arrangements for achieving an effective dynamic seal between a rotating, vibrating or reciprocating shaft and a stationary housing through which the shaft protrudes.

In many types of machinery it is necessary to provide a means for delivering rotary mechanical power into or out from a housing in which a fluid such as a liquid or air is maintained under a positive pressure. In order to achieve this without allowing the fluid to leak out around the shaft, a seal must be provided which fits closely about the shaft and which at the same time allows the shaft to rotate without undue friction. The seal, of course, must be resistant to the corrosive effects of the fluid being sealed; and at the same time it must be capable of withstanding extreme operating conditions such as temperature variation and the rubbing effects of the shaft itself.

In the past, fluid seals for most applications of this type comprised a sealing element made of rubber or similar material formed with a flexible sealing lip which provided an interference fit around the shaft which was to be sealed. The rubber sealing element was then forced into the shaft opening in the machine housing, and the resulting interference between the rubber element and the shaft opening completed the seal. In some cases, stiffening rings were provided to reinforce the rubber sealing element.

Certain difficulties were encountered with the use of synthetic rubber materials as above described for seal applications. These difficulties included the inability of the rubber material to withstand the corrosive effects of the fluid material being sealed. In addition, the sealing material usually provided a high degree of friction between itself and the rotating shaft. Also it was subject to a rather considerable amount of wear and therefore had an unduly short life span.

It has been discovered that synthetic polytetrafluoroethylene resins (herein referred to as PTFE) will overcome many of the corrosion, friction and wear problems inherent in synthetic rubber. Moreover, it was found that PTFE when used as a sealing element, causes a very thin film of the material to become deposited on the metal surface on which it is rubbed. This produces a self-lubrication which reduces the friction coefficient and provides a considerably long service life. Also, the use of PTFE in shaft seals permits operation over a temperature range anywhere from approximately $-80°$ C. to approximately $+260°$ C.

While PTFE materials overcome many of the problems of synthetic rubber seals, these materials possess other properties which create difficulties in adapting them for use as rotating shaft seals. PTFE materials, for example, are characterized by a lack of substantial elastomeric properties such as elastic "memory." As a consequence, it is difficult to obtain a satisfactory seal between the PTFE material and the outer housing into which it is secured. One arrangement for solving this problem included the provision of a cylindrically shaped metal casing having an inwardly projecting flange at one end into which the seal element was fitted. The diameter of the cylindrical casing was such as to provide an interference fit with the shaft opening in the housing, so that when the casing was fitted into the housing it was squeezed by the housing; and this squeezing action was transmitted to the sealing element so that the outer diameter of the sealing element was maintained tightly into the casing. It will be appreciated that this approach required very careful assembly procedures and very close tolerances; and in general it was an extremely tedious and difficult technique.

The present invention overcomes the difficulties of the prior art discussed above and provides a highly satisfactory novel fluid seal for rotating shafts; and moreover this novel seal is easily manufactured and does not require the extremely close tolerances required in prior seals.

In general, according to the present invention, there is provided a sealing element of PTFE material formed into washer shaped configuration and a washer-shaped gasket of an elastomeric material. The washer-shaped gasket is held against the sealing element by means of an annular casing having a channel section which opens inwardly thereof and into which the outer edges of the sealing element and gasket fit in face to face relationship. The casing serves to squeeze the gasket and sealing element together thereby providing a seal between the two. The casing may further be provided with means, such as an extension thereof, for securing it to the housing through which the shaft protrudes. It will be appreciated that the securing of the casing to the housing by means of the casing extension provides no stress transmission between the housing and the PTFE element, and therefore this operation does not produce any distortion, stress or other adverse effect upon the previously obtained seal between the casing and the element.

Of the drawings illustrating by way of example preferred embodiments of the invention:

FIG. 1 is an elevational view, partially in section, showing a portion of a machine housing in which is mounted a novel shaft seal assembly according to the present invention;

FIG. 2 is an enlarged cross-sectional view, partially cut away, taken along line 2—2 of FIG. 1;

FIG. 3 is a cross-sectional view looking along line 3—3 of FIG. 2; and

FIG. 4 is a fragmentary view similar to the upper portion of FIG. 2 but showing a further embodiment.

In FIG. 1 there is shown a portion of a machine housing 10 having an opening 12 through which a shaft 14 projects. The shaft 14 is rotatably mounted within the machine housing 10 by means of a bearing assembly 16.

A seal assembly 18 is fitted into the opening 12 of the machine housing 10 in a manner such as to prevent the leakage of fluid which may be contained within the housing 10 out through the opening 12. The seal assembly 18 fits closely about the shaft 14 and permits the shaft 14 to rotate while, at the same time, preventing the leakage of fluid from within the machine housing 10 out along the surface of the shaft 14.

Turning now to FIGS. 2 and 3 it will be seen that the seal assembly 18 includes a seal housing 20 of generally cylindrical configuration and having an inwardly projecting flange region 22. The seal housing 20 is force fitted into the opening 12 of the machine housing 10 so as to insure against oil leakage out between the machine housing and the seal housing.

The seal assembly 18 further includes a washer-shaped sealing element 24 of flexible PTFE. This element has a normal internal diameter which is somewhat smaller than the shaft 14; so that as shown in FIG. 2 the shaft 14 in passing through the central opening of the sealing element 24 actually stretches it somewhat to form an interference fit. This has the additional function of forming somewhat of an internally directed curvature in the sealing element 24 thus enhancing its effectiveness in providing a fluid seal against the shaft 14, especially where a positive pressure exists within the machine housing 10.

A gasket 26 of an elastomeric material is positioned flat against the sealing element 24. As shown in FIG. 2 the outer diameters of the gasket 26 and sealing element 24 coincide; however, the inner diameter of the gasket 26 is larger that that of the sealing element 24 so that only the sealing element 24 actually touches the shaft 14. A rigid metal washer 28 having internal and external dimensions similar to those of the gasket 26 is placed on the opposite side of the PTFE sealing element 24, thereby sandwiching the sealing element 24 between the washer 28 and the gasket 26. The washer, gasket and sealing element are squeezed together in assembly by means of a metal plate casing 30 which extends over and is blocked about the outer peripheral surfaces of the washer, gasket and sealing element. The casing 30, as shown in FIG. 2, includes a front wall 32 which lies flat against the outer lateral surface of the gasket 26. The wall 32 has the same inner and outer diameters as those of the gasket 26, so that the wall 32 serves as a pressure member which distributes squeezing pressures substantially uniformly over the entire surface of the gasket 26 in the same manner that the washer 28 distributes squeezing pressures over a comparable surface of the PTFE sealing element 24. Actually, it will be seen that the washer 28 forms an inner wall portion to the casing 30 corresponding to the outer wall portion 32. This particular arrangement allows the casing 30 to be formed and provided the required squeezing function simply by turning down a relatively small inner lip 34 about the outer surface of the washer 28. Thus, the casing 30 together with the washer 28 provides a channel section which opens inwardly, that is, toward the center of the shaft 14.

The casing 30 includes an extension 36 connected to its outer wall portion 32. This extension 36 is blocked around the inwardly extending flange region 22 of the seal housing 20 thereby securing the casing 30 to the seal housing 20.

In operation of the above described seal, the shaft 14 while rotating, will be sealed by the inner diameter edge of the PTFE sealing element 24. The sealing element 24, even though it lacks substantial elastomeric properties, is nevertheless sealed within the casing 30 by virtue of the squeezing effect produced by the casing 30 between the sealing element 24 and the gasket 26. The gasket 26, being elastomeric, effects the seal when squeezed, between itself and the sealing element 24, and at the same time effects a like sealing between itself and the outer wall 32 of the casing 30.

It will further be appreciated that the blocking of the extension 36 over the flange region 22 of the seal housing 20 may be effected without production of any stresses between the housing 20 and the PTFE sealing element 24. Thus, the delicate operations which characterized the provision of fluid seals with PTFE sealing elements in the past, are not encountered with the arrangement of the present invention.

FIG. 4 illustrates an embodiment wherein there is provided a seal housing 40 having an external diameter which is considerably larger than the outer diameter of the casing 30. The arrangement of FIG. 4 demonstrates that it is possible to provide a seal assembly according to the present invention without having to alter the dimensions or configuration of the PTFE sealing element 24 or the casing 30, so long as the diameter of the shaft 14 is unaltered. Thus, for a given shaft diameter sealing assemblies may be provided which will accommodate openings 12 in machine housings 10 of any diameter merely by providing seal housings 20 whose flange region 22 is sufficient to extend to a location substantially coincident with the inner diameter of the gasket 26 and the washer 28. It will be appreciated that this arrangement considerably reduces the number of different sizes of parts which must be stocked in order to accommodate the several machine applications which exist.

It will further be appreciated that the casing 30 together with the secured PTFE sealing element 24 may be removed and replaced from the seal housing 20 simply by unblocking of the extension 36. The casing 30 together with the sealing element 24 may then be replaced on another shaft in a different machine; and the disassembly and reassembly procedures may be carried out without the high degree of care previously required, since none of these operations impose any direct transmittal of forces to the PTFE sealing element 24. Thus, the life of the PTFE sealing element 24 is considerably extended.

The PTFE sealing element 24 as indicated previously is made of synthetic polytetrafluoroethylene. It may, of course, include reinforcing agents such as carbon black, glass fibers or bronze powder which will act to increase its life and improve its operational characteristics. The gasket 26, as previously mentioned is of an elastomeric material and preferably comprises a fluoroelastomer.

I claim:

1. A seal assembly for shafts comprising a washer-shaped sealing element of polytetrafluoroethylene material, a washer-shaped gasket of elastomeric material positioned against one face of said sealing element, a rigid washer element positioned against the other face of said sealing element, the outer peripheries of said sealing element, said gasket and said washer element being coterminous, and a casing holding said washer element, said gasket and said sealing element in face-to-face operative relationship, said sealing element having an inner peripheral diameter less than the inner diameter of said gasket and said casing, said casing having one section thereof disposed in contact with said gasket against the face thereof remote from said sealing element and another section of said casing extending around the outer peripheries of said washer, said gasket and said sealing element and into contact with a portion of the face of said washer remote from said sealing element, and a radially outwardly generally U-shaped extension on one section of said casing for securing said seal assembly to an accommodating seal housing.

2. The seal assembly of claim 1 wherein said extension is formed on the section of said casing in contact with said gasket.

3. The seal assembly of claim 1 wherein the inner diameters of said gasket element and said washer are substantially coterminous and the section of said casing adjacent said gasket in contact therewith over substantially the entire face of said gasket.

4. The seal assembly of claim 1 wherein said washer and said casing are formed of metal.

5. In combination, a seal housing adapted to be received within an accommodating operative through which a rotatable shaft is to be mounted, a flange on said seal housing and a seal assembly for said shaft including a washer-shaped sealing element of sealing material mounted in sealing contact about said shaft, a washer-shaped gasket of elastomeric material positioned against one face of said sealing element, a rigid washer element positioned against the other face of said sealing element, the outer peripheries of said sealing element, said gasket and said washer element being coterminous, and a casing holding said washer element, said gasket and said sealing element in face-to-face operative relationship, said sealing element having an inner peripheral diameter less than the inner diameter of said gasket and said casing, said casing having one section thereof disposed in contact with said gasket against the face thereof remote from said sealing element and another section of said casing extending around the outer peripheries of said washer, said gasket and said sealing element and into contact with a portion of the face of said washer remote from said sealing element, and a radially outwardly generally U-shaped extension on one section of said casing for securing said seal assembly to said flange of seal housing with said sealing element in sealing contact about said shaft.

6. The seal assembly of claim 5 wherein said sealing element is formed of polytetrafluoroethylene and said extension is formed on the section of said casing in contact with said gasket.

7. In combination a seal housing having a cylindrical portion and an inwardly extending flange portion defining a circular opening, a washer-shaped seal element of polytetrafluoroethylene, a washer-shaped gasket of an elastomeric material and a rigid seal casing having a pair of opposed sections within which said seal element and said gasket are sealed in contiguous disposition, said seal element having an inner peripheral diameter less than the inner diameter of said gasket and said casing, said seal element and said gasket being urged into sealed relationship by and between said opposed sections and a radially outwardly generally U-shaped extension on one of said sections for securing said casing to said flange with said sealing element in operative position within said opening.

8. The invention as defined in claim 7 wherein said extension is formed on the section of casing adjacent said gasket.